(12) United States Patent  (10) Patent No.: US 7,777,815 B2
Kimura                      (45) Date of Patent:     Aug. 17, 2010

(54) VIDEO IMAGE QUALITY CONTROL APPARATUS AND METHOD

(75) Inventor: Takahiro Kimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/350,888

(22) Filed: Jan. 8, 2009

(65) Prior Publication Data

US 2009/0244382 A1    Oct. 1, 2009

(30) Foreign Application Priority Data

Mar. 27, 2008   (JP) ............................. 2008-083595

(51) Int. Cl.
H04N 5/57 (2006.01)
H04N 5/58 (2006.01)
(52) U.S. Cl. .................. 348/602; 348/603; 345/207
(58) Field of Classification Search ......... 348/602–603, 348/587–589, 658; 345/204, 207
See application file for complete search history.

(56) References Cited

U.S. PATENT DOCUMENTS

| 5,416,534 | A |   | 5/1995 | Hayashi et al. |
| 5,774,830 | A | * | 6/1998 | Tsuji ............................ 701/213 |
| 6,011,547 | A |   | 1/2000 | Shiota et al. |
| 6,288,757 | B1 |  | 9/2001 | Kim |
| 6,339,429 | B1 | * | 1/2002 | Schug ......................... 345/589 |
| 7,522,134 | B2 | * | 4/2009 | Mizumaki ..................... 345/87 |
| 2003/0098874 | A1 |  | 5/2003 | Tobiya |
| 2006/0132656 | A1 |   | 6/2006 | Yamamoto et al. |
| 2007/0296874 | A1 |   | 12/2007 | Yoshimoto et al. |

FOREIGN PATENT DOCUMENTS

| JP | 09-265271 | 10/1997 |
| JP | 2000-232657 | 8/2000 |
| JP | 2003-189324 | 7/2003 |
| JP | 2004-120267 | 4/2004 |
| JP | 2004-266605 | 9/2004 |
| JP | 2005-242173 | 9/2005 |
| WO | WO 2006-114950 | 2/2006 |

OTHER PUBLICATIONS

Japanese Patent Application No. 2008-083595 Office Action mailed Feb. 24, 2009 (English Translation).

* cited by examiner

*Primary Examiner*—M. Lee
(74) *Attorney, Agent, or Firm*—Blakely, Sokoloff, Taylor & Zafman LLP

(57) ABSTRACT

According to an aspect of the present invention, there is provided a video image quality control apparatus including: a video processing module configured to adjust image quality based on a control signal; a data table holder configured to hold a data table representing information of a start time and an end time of a daytime in each area; a determination module configured to determine a current location of the apparatus based on areal setting information of a receiving channel; a specifying module configured to specify a start time and an end time of a daytime at the current location by referring to the data table based on information of the current location; and an adjusting module configured to output the control signal based on a start time and an end time of a daytime specified by the specifying module.

5 Claims, 5 Drawing Sheets

| | 1. HOKKAIDO | | 2. TOHOKU/KANTO | | 3. CHUBU/KINKI | | 4. CHUGOKU/SHIKOKU | | 5. KYUSHU | |
|---|---|---|---|---|---|---|---|---|---|---|
| | SUNRISE | SUNSET | SUNRISE | SUNSET | SUNRISE | SUNSET | SUNRISE | SUNSET | SUNRISE | SUNSET |
| SPRING (FEB TO APR) | 5:44 | 17:40 | 5:49 | 17:48 | 6:06 | 18:05 | 6:18 | 18:17 | 6:26 | 18:25 |
| SUMMER (MAY TO JUL) | 4:05 | 19:05 | 4:33 | 18:51 | 4:52 | 19:05 | 5:05 | 19:17 | 5:15 | 19:23 |
| AUTUMN (AUG TO OCT) | 5:13 | 17:44 | 5:23 | 17:48 | 5:40 | 18:05 | 5:53 | 18:17 | 6:01 | 18:25 |
| WINTER (NOV TO JAN) | 6:48 | 16:13 | 6:35 | 16:39 | 6:50 | 16:58 | 7:01 | 17:11 | 7:08 | 17:21 |

VIDEO IMAGE QUALITY CONTROL APPARATUS AND METHOD

CROSS-REFERENCE TO RELATED APPLICATIONS

This application is based upon and claims the benefit of priority from Japanese Patent Application No. 2008-083595, filed on Mar. 27, 2008, the entire contents of which are incorporated herein by reference.

BACKGROUND

1. Field

An aspect of the present invention relates to a video image quality control apparatus and method by which image quality can be automatically adjusted in accordance with an area where the video image is viewed.

2. Description of the Related Art

A video display device is heretofore provided with a so-called image quality adjusting function which adjusts screen brightness automatically in accordance with ambient brightness. Some digital still cameras use a method of adjusting image quality of a display module in accordance with time, compared with the method of adjusting image quality simply in accordance with detected ambient brightness.

There is proposed a television camera apparatus which uses sunrise and sunset information based on position information as well as time information to control an infrared cut filter mechanism (see JP-A-2004-266605, for instance). In this manner, the infrared cut filer can be used effectively in accordance with a condition of ambient brightness at a sunset time.

Although a function of adjusting image quality in accordance with time has been provided in image quality adjustment technology, there is a demand for more improvement because this adjustment has not been optimized yet.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

FIG. 3 is a view showing an example of a data table held in a sunrise/sunset time table holder in FIG. 1;

FIG. 4 is a view showing another example of the data table held in the sunrise/sunset time table holder in FIG. 1;

DETAILED DESCRIPTION

Various embodiments according to the present invention will be described hereinafter with reference to the accompanying drawings. In general, according to one embodiment of the present invention, a video image quality control apparatus includes: a video processing module configured to adjust image quality based on a control signal; a data table holder configured to hold a data table representing information of a start time and an end time of a daytime in each area; a determination module configured to determine a current location of the apparatus based on areal setting information of a receiving channel; a specifying module configured to specify a start time and an end time of a daytime at the current location by referring to the data table based on information of the current location; and an adjusting module configured to output the control signal based on a start time and an end time of a daytime specified by the specifying module.

An embodiment of the invention will be described below with reference to the drawings. First, a broadcast receiver to which the invention is applied will be described schematically.

Figure 1:
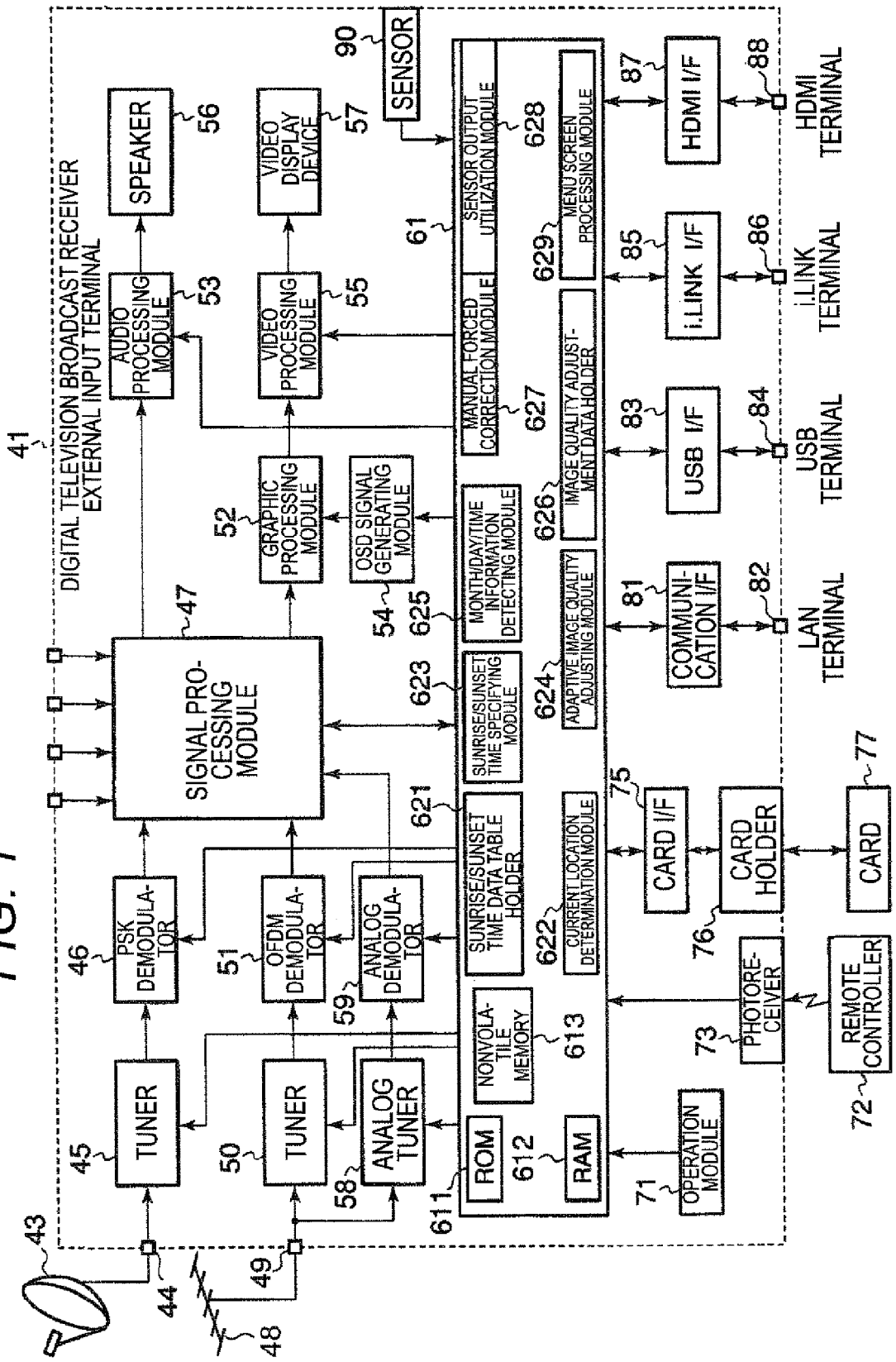
FIG. 1 is an exemplary block diagram showing an embodiment of the invention.

FIG. 1 shows a principal signal processing system of a digital television broadcast receiver 41. That is, when a satellite digital television broadcast signal received at a BS/CS digital broadcast receiving antenna 43 is supplied to a satellite digital broadcast tuner 45 through an input terminal 44, a broadcast signal of a desired channel is selected by the tuner 45.

After the broadcast signal of the channel selected by the tuner 45 is supplied to a Phase Shift Keying (PSK) demodulator 46 and demodulated into digital video and audio signals by the PSK demodulator 46, the demodulated digital video and audio signals are output to a signal processing module 47.

When a terrestrial digital television broadcast signal received at a terrestrial digital broadcast receiving antenna 48 is supplied to a terrestrial digital broadcast tuner 50 through an input terminal 49, a broadcast signal of a desired channel is selected by the tuner 50.

After the broadcast signal of the channel selected by the tuner 50 is supplied to an Orthogonal Frequency Division Multiplexing (OFDM) demodulator 51 and demodulated into digital video and audio signals by the OFDM demodulator 51, the demodulated digital video and audio signals are output to the signal processing module 47.

An analog tuner 58 for receiving a terrestrial wave analog signal is also provided. The signal received at the analog tuner 58 is demodulated by an analog demodulator 59 and output to the signal processing module 47.

Then, the signal processing module 47 selectively applies given digital signal processing to the digital video and audio signals supplied from the PSK demodulator 46, the digital video and audio signals supplied from the OFDM demodulator 51, the video and audio signals supplied from the analog demodulator 59 or video and audio signals supplied from an external line input terminal and outputs the processed digital video and audio signals to a graphic processing module 52 and an audio processing module 53 respectively.

The graphic processing module 52 has a function of superimposing an On Screen Display (OSD) signal generated by an OSD signal generating module 54 on the digital video signal supplied from the signal processing module 47 and outputting the resulting signal. In addition, the graphic processing module 52 can selectively output either of the output video signal of the signal processing module 47 and the output OSD signal of the OS signal generating module 54, or can output the two output signals in combination so that the two output signals can be displayed on halves of a screen, respectively.

The digital video signal output from the graphic processing module 52 is supplied to a video processing module 55. This video processing module 55 converts the input digital video signal into an analog video signal in a format allowed to be displayed on an video display device 57, and outputs the analog video signal to the video display device 57 for video display.

The audio processing module 53 converts the input digital audio signal into an analog audio signal in a format allowed to be reproduced by a speaker 56, and outputs the analog audio signal to the speaker 56 for audio reproduction.

All operations, inclusive of the aforementioned various receiving operations, of this digital television broadcast receiver 11 are collectively controlled by a control module 61.

The control module 61 contains a Central Processing Unit (CPU), etc. Upon reception of operation information from an operation module 71 or upon reception of operation information sent out from a remote controller 72 through a photoreceiver 73, the control module 61 generally controls the respective modules so that the operation contents can be reflected on the apparatus.

In this case, the control module 61 chiefly uses a Read Only Memory (ROM) 611, a Random Access Memory (RAM) 612 and a nonvolatile memory 613. A control program to be executed by the CPU is stored in the ROM 611. The RAM 612 provides a working area to the CPU. Various kinds of setting information and control information, etc. are stored in the nonvolatile memory 613.

A card Interface (I/F) 75 is interposed between the control module 61 and a card holder 76. A memory card 77 can be mounted in the card holder 76. In this manner, the control module 61 can transmit/receive information to/from the memory card 77 mounted in the card holder 76 through the card I/F 75. Although not shown, another card I/F may be interposed between the control module 61 and a card holder capable of being provided with a second memory card.

A communication I/F 81 is interposed between the control module 61 and a first LAN terminal 82. In this manner, the control module 61 can transmit/receive information to/from an LAN-supported Hard Disk Drive (HDD) connected to the first LAN terminal 82, through the communication I/F 81. In this case, the control module 61 has a Dynamic Host Configuration Protocol (DHCP) server function and performs control based on an Internet Protocol (IP) address allocated to the LAN-supported HDD connected to the first LAN terminal 82. Although not shown, another communication I/F may be further interposed between the control module 61 and a second LAN terminal.

A USB I/F 83 is interposed between the control module 61 and a USB terminal 84. In this manner, the control module 61 can transmit/receive information to/from various devices connected to the USB terminal 84, through the USB I/F 83.

An i.Link (registered trademark) I/F 85 is interposed between the control module 61 and an i.Link (registered trademark) terminal 86. In this manner, the control module 61 can transmit/receive information to/from various devices connected to the i.Link (registered trademark) terminal 86, through the i.Link (registered trademark) I/F 85.

In addition, the control module 61 can transmit/receive information to/from various devices connected to a High Definition Multimedia Interface (HDMI) terminal 88, through an HDMI I/F 87 according to the HDMI Specification.

Further, for example, the control module 61 has a sunrise/sunset time table holder 621. Although the term "sunrise/sunset time" is used in the description of the embodiment of the invention, the invention is not limited to the specific term. That is, the concept of the term can be set widely. For example, two points of time on the boundary between day and night or start and end points of daytime may be used. This is because such reference points of time may be adjusted or corrected.

Description will be made below on an assumption that the term "sunrise/sunset time" is used. This sunrise/sunset time table holder 621 holds at least an areal sunrise/sunset time table. This sunrise/sunset time table holder 621 may be built in another memory connected to the control module 61. In addition, the control module 61 has a current location determination module 622. This current location determination module 622 can determine a current location of the apparatus based on areal setting information of digital broadcast receiving channels. In addition, the control module 61 has a sunrise/sunset time specifying module 623. This sunrise/sunset time specifying module 623 can specify sunrise/sunset time of the current location by referring to the sunrise/sunset time table based on information of the current location. Further, the control module 61 has an image quality adjusting module 624. This image quality adjusting module 624 adjusts image quality in a time zone, inclusive of before and after the sunrise/sunset time, based on the sunrise/sunset time specified by the sunrise/sunset time specifying module 623.

In addition, the control module 61 is provided with a month/day/time information detecting module 625. The month/day/time information detecting module 625 detects current month/day/time information from time information of the apparatus. Further, the control module 61 has an image quality adjustment data holder 626. Image quality adjustment data are stored in advance, as most suitable values corresponding to the sunrise/sunset times of the sunrise/sunset time table holder 621, in the image quality adjustment data holder 626.

The adjustment data of the image quality adjustment data holder 626 may be fetched from an external memory. A manual forced correction module 627 through which a user or a sales person can forcedly correct the data of the image quality adjustment data holder 626 may be provided if necessary. When the manual forced correction module 627 is used, for example, a forced correction button of the operation module 71 is set to a forced correction mode so that UP/DOWN buttons can be used for increasing/decreasing the time zone and areal adjustment data while a menu screen is viewed. It is a matter of course that an item for restoring setting to initial setting is provided in this menu screen so that processing for restoring the adjustment data to initial adjustment data can be performed.

Further, a sensor 90 for detecting ambient brightness may be provided in the aforementioned apparatus. There may be provided a sensor output utilization module 628 which corrects the image quality adjustment data by adding/subtracting the signal detected by the sensor 90 to/from the image quality adjustment data. For activation and use of the sensor output utilization module 628 which is turned off, setting can be made when the operation module 71 is operated to display a menu screen, select a sensor output utilization item and press an OK button.

Figure 2:
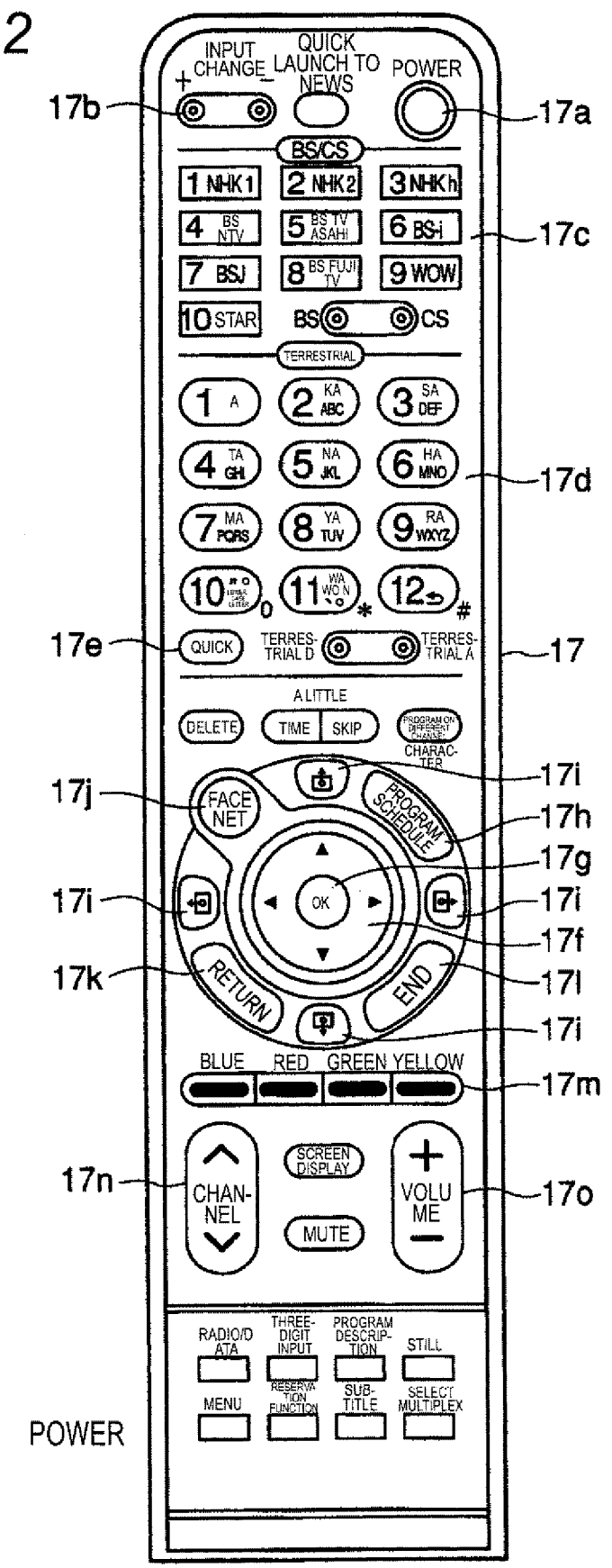
FIG. 2 is a view showing an example of a remote controller.

FIG. 2 shows the external appearance of the remote controller 72. This remote controller 72 is mainly provided with a power key 17a, input change keys 17b, direct channel selection keys 17c for satellite digital broadcast channels, direct channel selection keys 17d for terrestrial wave broadcast channels, a quick key 17e, cursor keys 17f, an OK key 17g, a program schedule key 17h, page change keys 17i, a face net (navigation) key 17j, a return key 17k, an end key 17l, color keys 17m of blue, red, green and yellow, channel UP/DOWN keys 17n, volume adjusting keys 17o, etc. When the program schedule key 17h is pressed, a program schedule is displayed. When the end key 17l is pressed, the display mode goes back to an airplay (video display of a currently receiving channel) state. When, for example, the quick key 17e is pressed, the display mode can be shifted to a mode for display of various menu screens.

Figure 3:
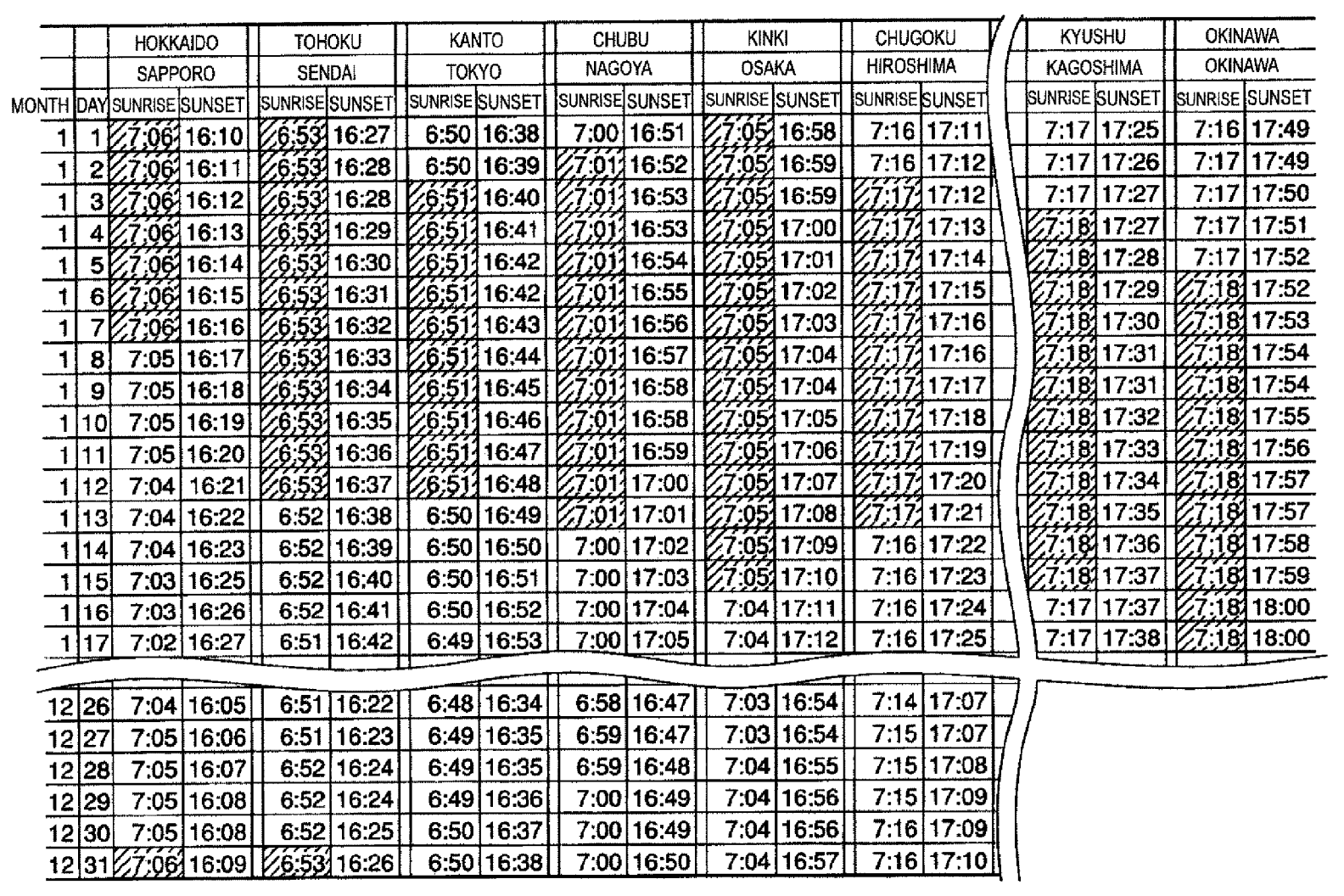

FIGS. 3 and 4 show examples of the sunrise/sunset time table held in the sunrise/sunset time table holder 621. In the data table shown in FIG. 3, months and days are written vertically and Japanese areas are written horizontally. Sunrise times and sunset times in respective months and days are written vertically in each area column. Accordingly, when the current location of the apparatus and the month/day are determined, sunrise and sunset times in this day are determined. That is, in this case, the table holder 621 holds the areal sunrise/sunset time table classified according to months and days.

The sunrise/sunset time table shown in FIG. 4 is vertically classified into spring, summer, autumn and winter, so that sunrise and sunset times can be determined based on an average sunshine duration in each seasons. The sunrise/sunset time table in FIG. 4 is horizontally classified into areas broader than those of the table in FIG. 3. That is, in this case, the sunrise/sunset time table holder 621 holds the areal sunrise/sunset time table classified according to seasons.

Figure 5:
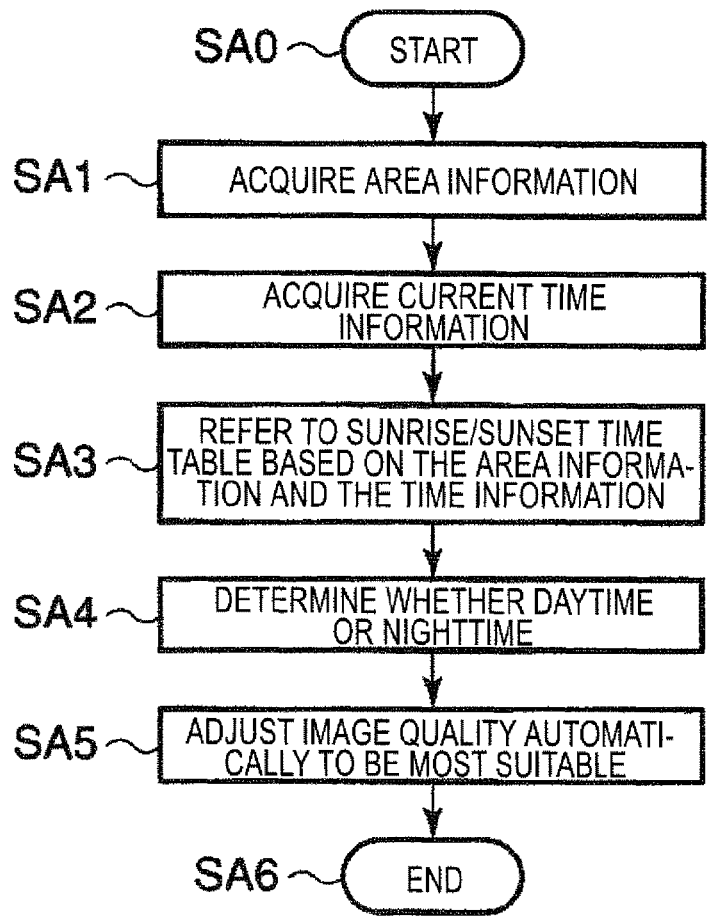
FIG. 5 is a flow chart for describing an example of operation of an apparatus in FIG. 1.

FIG. 5 shows an example of operation of the apparatus in FIG. 1. This operation flow is activated, for example, periodically. When the operation flow is activated, current location information is first acquired from the current location determination module 622 (Step SA1). Then, month/day/time information is acquired from the month/day/time information detecting module 625 so that the current time is determined (Step SA2). Then, the sunrise/sunset time table of the sunrise/sunset time table holder 621 is referred to based on the acquired current location information and month/day/time information (Step SA3) so that a determination is made as to whether the current time is in a sunrise time zone or in a sunset time zone or whether the current time is in the daytime or in the nighttime (Step SA4). When a determination is made that the current time is in the sunset time zone, image quality is adjusted based on image quality adjustment data preset for this time zone (Step SA5). Then, the above described routine is terminated (Step SA6).

Figure 6:
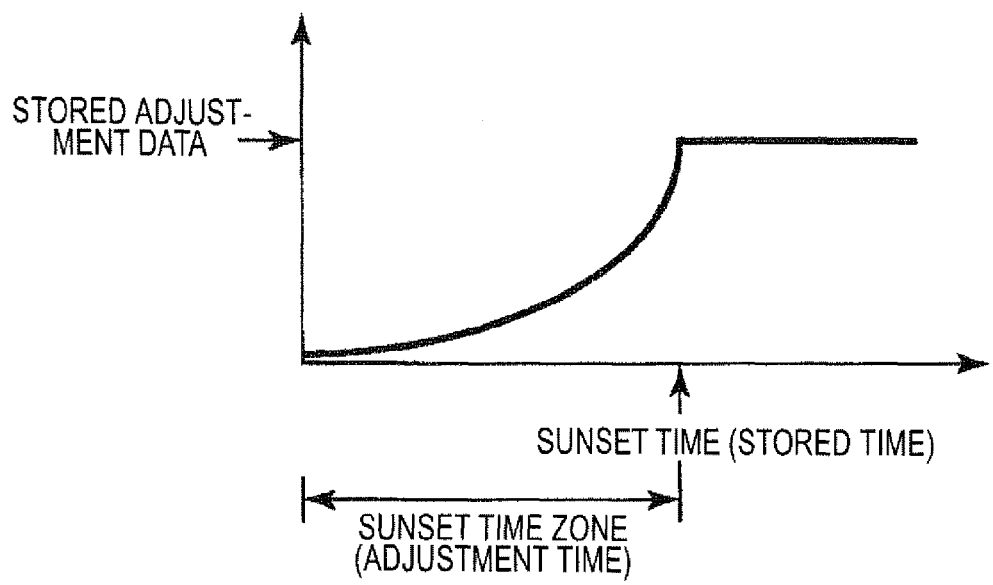
FIG. 6 is an explanatory graph showing an example of change in adjustment data when the apparatus in FIG. 1 adjusts image quality.

FIG. 6 is a graph showing an example of characteristic when, for example, the aforementioned apparatus adjusts screen brightness at a sunset time. In the graph, the horizontal axis expresses time and the vertical axis expresses brightness adjustment data. This apparatus gradually performs adjustment taking a lot of time (e.g. 50 minutes to 30 minutes) to change image quality adjustment data so as not to suddenly change data into adjustment data given from the image quality adjustment data holder 626 when the sunset time comes.

In the apparatus according to the invention, the sensor output utilization module 628 can be activated by a user optionally. In some case, the television broadcast receiver may not be used in an environment originally intended by a designer of the apparatus. For example, the television broadcast receiver may be used in an environment where the television broadcast receiver is influenced by illuminations having a strong influence on brightness in addition to ambient brightness change due to the sunrise/sunset. In such a case, the sensor output utilization module 628 can be activated to perform automatic image quality adjustment more properly.

Incidentally, this invention is not limited to the aforementioned embodiment, but constituent members of this invention can be modified to be realized practically without departing from the gist of the invention. In addition, constituent members disclosed in the aforementioned embodiment may be properly used in combination to form various inventions. For example, some constituent members may be omitted from all the constituent members disclosed in the embodiment.

What is claimed is:

1. A video image quality control apparatus, in a broadcast receiver apparatus having a video processing portion to which a digital video signal is input and which adjusts screen brightness by adjusting the digital video signal in accordance with image quality adjustment data, the video image quality control apparatus comprising:
   a daytime start/end time table holding portion that holds at least a regional daytime start/end time table;
   an installation region determination portion that determines an installation region of the apparatus based on regional setting information according to a digital broadcasting protocol;
   a daytime start/end time specifying portion that specifies daytime start/end time of the installation region by referring to the daytime start/end time table based on information of the installation region;
   an adaptive image quality adjusting portion that outputs the digital video signal that gradually changes in a time zone before reaching the start/end time, and that adjusts the screen to a bright direction before the start time and to a dark direction before the end time, based on the specified daytime start/end time;
   a sensor that detects ambient brightness; and
   a sensor output utilization portion that corrects the image quality adjustment data in accordance with an output of the sensor.

2. The video image quality control apparatus according to claim 1, wherein the daytime start/end time table holding portion holds the regional daytime start/end time table classified by seasons.

3. The video image quality control apparatus according to claim 1, wherein the daytime start/end time table holding portion holds the regional daytime start/end time table classified by month and day.

4. The video image quality control apparatus according to claim 1, wherein the sensor output utilization portion is selectively settable to be an on-state or an off-state.

5. The video image quality control apparatus according to claim 1, wherein the apparatus further comprises a forcible correction portion that forcibly corrects the image quality adjustment data by an external operation.

* * * * *